Patented Aug. 27, 1940

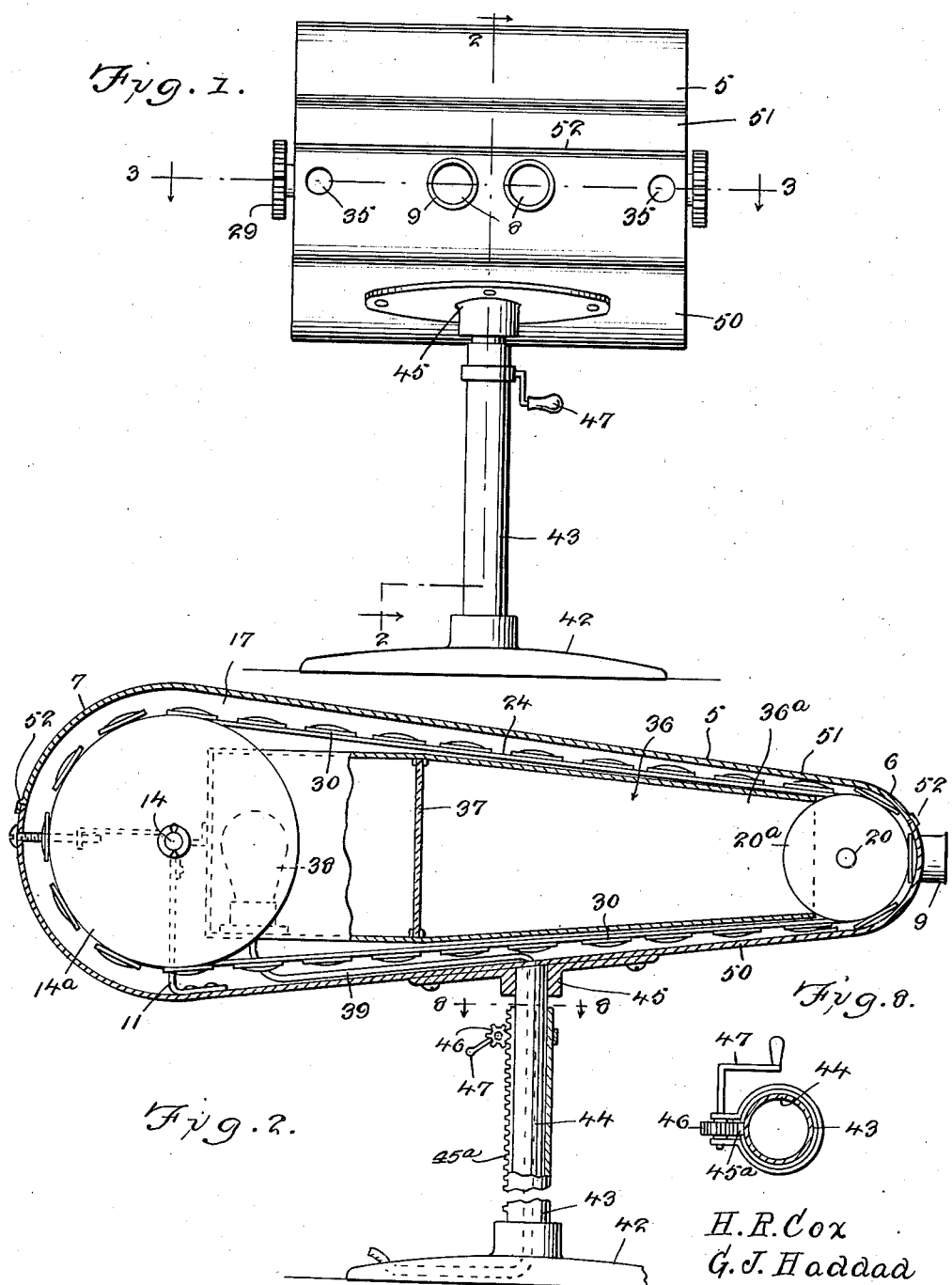

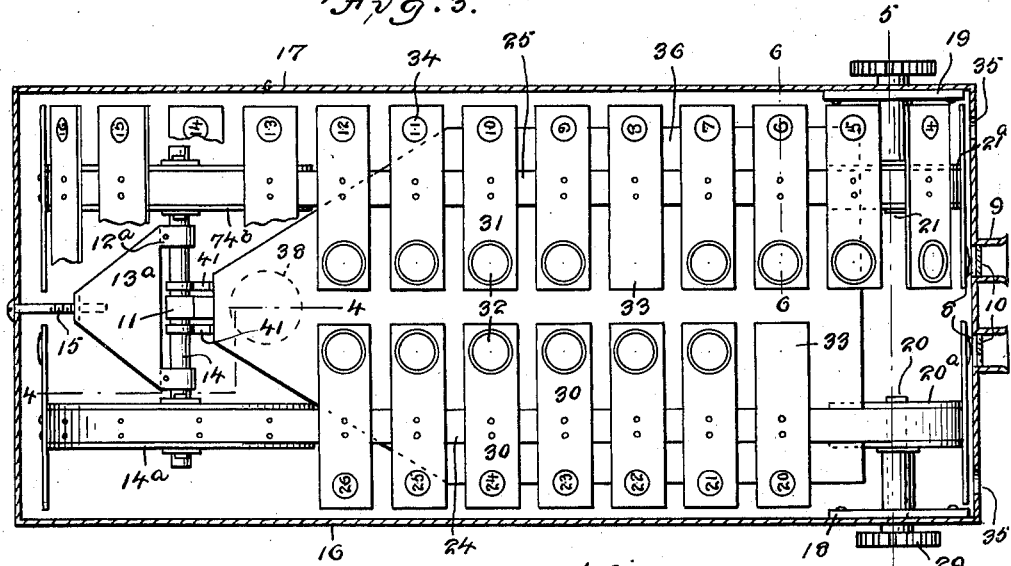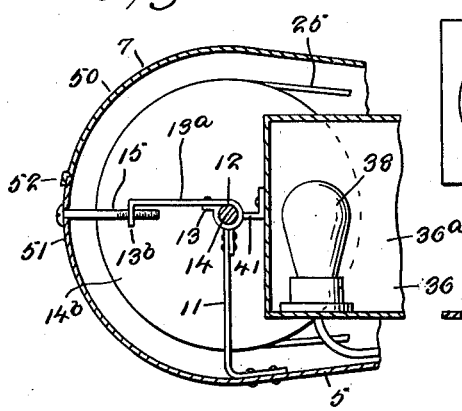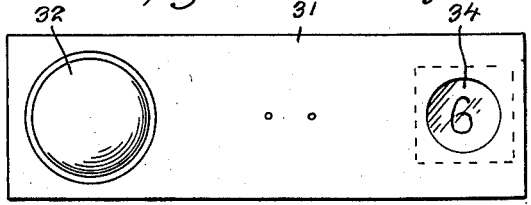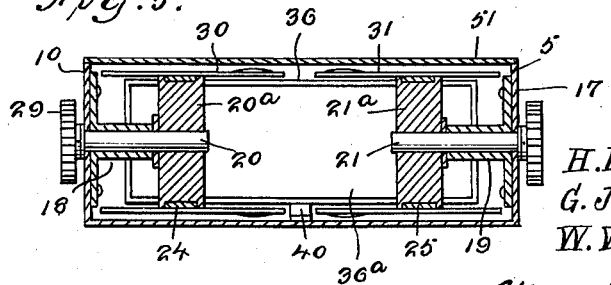

2,212,597

UNITED STATES PATENT OFFICE 2,212,597

OPTOLOGY

George J. Haddad, Howard R. Cox, and William W. Thomas, Chicago, Ill.

Application April 18, 1938, Serial No. 202,760

2 Claims. (Cl. 88—22)

Our invention relates to optology and more particularly to opsiometers of a binocular type.

One of the principal objects of our invention is to provide an opsiometer of simple construction and improved operation whereby persons with and without a knowledge of optotechnology may reliably select suitable lenses for glasses to normalize vision without the aid or assistance of other persons.

Another object of our invention is to provide an opsiometer of the above described character equipped with an organization of test lenses and operable for selectively interposing said lenses within the line of vision whereby the vision of one eye may be tested simultaneously with the other.

A further object of our invention is to provide an apparatus of the above described character equipped with a test chart or scanning device together with means for illuminating the latter to sharply define the optotype thereon.

A still further object of our invention is to provide an eye testing apparatus equipped with means whereby the same may be adjusted in an axometric manner.

Still another object of our invention is to provide an opsiometer of a binocular type equipped with means wherein one eye may be tested independently of the other together with means for identifying the individual test lenses whereby the selected lenses, which normalize the vision, may be noted for subsequent selection of glasses containing lenses of identical power.

Other objects and advantages will be apparent from the following description, appended claims and annexed drawings.

Referring to the drawings wherein like reference characters designate like parts throughout the several views:

Figure 1 is a front elevation of our invention.

Figures 2 and 3 are sectional views taken on the lines 2—2 and 3—3 of Figure 1 respectively.

Figure 4 is a fragmentary detail vertical section of a rear portion of our apparatus.

Figures 5 and 6 are sectional views taken on the lines 5—5 and 6—6 of Figure 3 respectively.

Figure 7 is a top plan view of one of the lens plates.

Figure 8 is a detail sectional view taken on the line 8—8 of Figure 2.

In practicing our invention as depicted in the accompanying drawings we employ an elongated sectional housing 5 tapering towards the front end thereof and fashioned with rounded front and rear walls 6 and 7 respectively. The front wall 6 is provided with sight apertures 8 and fashioned with a pair of scopes or eye pieces 9 embracing the apertures. The eye pieces 9 are equipped with transparent panels 10 and fit about the eyes of a person in a manner to prevent the admittance of light through said eye pieces.

The bottom wall of the rear end of the housing has attached thereto an upwardly extending resilient bracket 11 having secured on the upper end thereof a bearing 12. The bearing 12 is constructed of resilient material and is of the split type for clamping engagement with a transversely extending shaft 14. A pair of split type bearings 12a are spaced from the bearing 12 and are constructed of resilient material formed with a pair of rearwardly extending arms 13 and 13a connected together by rivets or the like to clampingly secure the bearing about the transversely extending shaft 14. The arm 13a is of a greater length than the arm 13 and formed on the end thereof with an offset section 13b in which is threaded a screw 15 rotatably carried by the rear wall 7 whereby the shaft 14 may be forwardly and rearwardly adjusted for a purpose hereinafter set forth. The ends of the shaft 14 extend beyond the bearing 12 and terminate within side walls 16 and 17 forming the sides of the housing and have rotatably mounted thereon a pair of grooved pulleys 14a and 14b.

The front end of the housing houses a pair of bearings 18 and 19 secured to the side walls 16 and 17 respectively and in which are journaled rotatable shafts 20 and 21 respectively. The shafts have keyed thereto grooved pulleys 20a and 21a respectively. Spaced endless belts 24 and 25 are trained over the pulleys 14a, 20a and 14b, 21b respectively. Each of the shafts 20 and 21 are provided with knurled disks 29 on the outside of said housing whereby to manually rotate said shafts independently of each other thereby permitting independent relative movement of the belts.

The screw 15 may be operated to adjust the shaft 14 for moving the pulleys 14a and 14b forwardly or rearwardly to take up slack in the belts. Secured on the outer faces of the belts 24 and 25 are groups of spaced transversely extending lens plates 30 and 31 respectively. The plates of one group are adjustable relative to the plates of the other group through the medium of the adjustability of the belts when moved independently by the respective pulleys 20a and 21a as heretofore set forth.

The plates 30 and 31 are apertured adjacent the inner ends for accommodating lenses 32, said lenses being of different powers for normalizing vision and adapted for registery with the apertures 8 in the front wall 6, thereby interposing the line of vision through the eye pieces 9. The inner end section of one of the plates of each group is of a plain construction and constitutes a shutter 33 whereby to close the respective apertures 8 for testing one eye independently of the other.

Each of the plates adjacent the outer ends thereof are provided with windows covered with transparent or translucent material having formed thereon indicia 34, for instance numerals, whereby to identify the lenses on the respective plates. The front wall 6 is formed with peep openings 35 through which the indicia on the plates having lenses or shutters registering with the apertures 8 may be readily noted for selection of glasses containing lenses of identical power.

Secured within the housing and interposed between the runs of the belts 24 and 25 is a casing 36 fashioned with a forwardly tapering section forming a vision chamber 36a having an open front and a rearwardly extending section having side walls tapering towards the rear thereof.

Secured within the casing is a test chart panel 37 which forms the rear walls of the chamber and partitions the forwardly and rearwardly extending sections from each other. Said test chart panel may, if desired, be frictionally secured within the casing to permit forward and rearward adjustment thereof to compensate for the adjustment of the screw 15. The panel is constructed of translucent material having optotype or indicia formed thereon and a light 38 is provided within the rearwardly extending section for illuminating the panel to sharply define the indicia or optotype thereon. Said light is operated from a suitable source of electrical energy (not shown) and connected thereto by an electrical conduit 39.

The front of the casing 36 is located rearwardly and adjacent the shafts 20 and 21 and embraces rearwardly extending portions of the pulleys 20a and 21a thereby permitting viewing of the chart 37 through the eye pieces 9 and lenses 32 and accentuating the indicia 34 through the peep openings 35.

The bottom wall of the forward end of the housing has secured thereto a rest 40 for adjustably supporting the front of the casing 36 whereby to maintain the same in spaced relation relative to the inner faces of the runs of the belts 24 and 25. The rear wall of said casing is secured to the shaft 14 by means of arms 41 and adjustable therewith.

A telescopic standard for effecting axometric adjustment of the housing serves to support the housing above the floor and comprises a base 42 fashioned with a vertically extending tube 43 in which is slidably mounted a bored shaft 44 connected to the bottom of said housing by means of a bracket 45 as clearly illustrated in Figures 1 and 2 of the drawings. The electrical conduit 39 extends from the rearwardly extending section of the casing 36 through the lower section of said housing into the bore of the shaft 44 thence through the tube 43 and base 42 as illustrated in Figure 2. The tube 43 is vertically slotted for receiving therein a rack 45a secured to the shaft 44. A gear 46 meshing with said rack 45 is mounted on the tube 43 and provided with a crank 46 for operating said gear whereby to raise and lower the shaft 44 through the medium of the rack 45a.

From the foregoing it will be apparent that when a person views the chart 37 through the eye pieces 9, the belts may be individually operated by means of the disks 29 as heretofore set forth to effect a registering of various lenses within the line of vision and thereby enable the person to select a lens or lenses best suited to his or her vision.

During the selecting or testing operation, one eye may be tested independently of the other by the positioning of one of the shutters 33 before one of the eyes. Vertical adjustment of the eye pieces relative to the line of vision may be effected by the operation of the crank 47 in a desired direction as heretofore set forth.

It is to be noted that the housing is of the sectional type having upper and lower sections 50 and 51 respectively fitted together as at 52 whereby the upper section may be removed for adjusting, replacing and cleaning the parts therewithin. Furthermore, the bracket 45 may be swiveled on the shaft 44 to effect lateral adjustment of the housing relative to the base 42 and a line of vision of a person using the apparatus. It is to be understood that the test chart panel 37 will be located at a scientifically correct distance from the eye openings and that the same may be readily adjustable for effecting this distance.

What we claim is:

1. In an opsiometer, a housing fashioned with a pair of openings, a casing mounted within said housing and defining a vision chamber having a single opening therein arranged in proximity to said eye openings, shafts having pulleys journaled within said housing and arranged one at each end of said casing, belts carried by said pulleys and rotatable about said casing, lenses mounted on said belts for selective registry with and between said eye openings and said single opening, a chart panel having optotype thereon and positioned within said casing, a light source mounted in said casing and rearwardly of said panel for illuminating the latter to define said optotype whereby to test vision through said lenses, said belts adjustable relative to each other whereby lenses of different powers are registered with said eye openings, and shutters carried by said belts for closing one of said eye openings relative to the other to effect independent testing of one eye relative to the other.

2. In an opsiometer, a housing fashioned with a pair of openings, a casing mounted within said housing and defining a vision chamber having a single opening therein arranged in proximity to said eye openings, shafts having pulleys journaled within said housing and arranged one at each end of said casing, belts carried by said puleys and rotatable about said casing, lenses mounted on said belts for selective registry with and between said eye openings and said single opening, a chart panel having optotype thereon and positioned within said casing, a light source mounted in said casing and rearwardly of said panel for illuminating the latter to define said optotype whereby to test vision through said lenses, and shutters carried by said belts for closing one of said eye openings relative to the other to effect independent testing of one eye relative to the other.

GEORGE. J. HADDAD.
HOWARD R. COX.
WILLIAM W. THOMAS.